(12) United States Patent
Buhler et al.

(10) Patent No.: US 7,884,521 B2
(45) Date of Patent: Feb. 8, 2011

(54) ROTOR SHAFT FOR A MAGNETIC BEARING DEVICE

(75) Inventors: Philipp Buhler, Zurich (CH); Rene Larsonneur, Winterthur (CH)

(73) Assignee: Mecos Traxler AG, Winterthur (CH)

( * ) Notice: Subject to any disclaimer, the term of this patent is extended or adjusted under 35 U.S.C. 154(b) by 320 days.

(21) Appl. No.: 12/064,431

(22) PCT Filed: Aug. 18, 2006

(86) PCT No.: PCT/CH2006/000440

§ 371 (c)(1),
(2), (4) Date: Feb. 21, 2008

(87) PCT Pub. No.: WO2007/022656

PCT Pub. Date: Mar. 1, 2007

(65) Prior Publication Data

US 2008/0185928 A1    Aug. 7, 2008

(30) Foreign Application Priority Data

Aug. 24, 2005 (EP) .................. 05405492
Sep. 5, 2005 (EP) .................. 05405519

(51) Int. Cl.
H02K 7/09 (2006.01)

(52) U.S. Cl. ............... 310/216.121; 310/90.5; 464/23

(58) Field of Classification Search .. 310/216.114–121, 310/124, 84, 90.5; 464/23, 179
See application file for complete search history.

(56) References Cited

U.S. PATENT DOCUMENTS

| 4,180,946 | A |   | 1/1980 | Heijkenskjold et al. |
| 4,387,936 | A |   | 6/1983 | Ishizawa |
| 4,935,654 | A | * | 6/1990 | Glass et al. ................. 310/90.5 |
| 5,216,308 | A | * | 6/1993 | Meeks ......................... 310/90.5 |
| 5,614,777 | A | * | 3/1997 | Bitterly et al. ................. 310/74 |
| 5,736,800 | A | * | 4/1998 | Iannello et al. ............. 310/90.5 |
| 6,121,704 | A |   | 9/2000 | Fukuyama et al. |
| 2003/0122451 | A1 | * | 7/2003 | Seki et al. ............. 310/323.01 |
| 2004/0021386 | A1 | * | 2/2004 | Swett ..................... 310/156.32 |

FOREIGN PATENT DOCUMENTS

| EP | 1517042 A1 | 3/2005 |
| JP | 1122333 A | 5/1989 |
| JP | 9133133 A | 5/1997 |

* cited by examiner

*Primary Examiner*—Quyen Leung
*Assistant Examiner*—Naishadh N Desai
(74) *Attorney, Agent, or Firm*—Sughrue Mion, PLLC

(57) ABSTRACT

A rotor shaft (200) for a magnetic bearing device (1) is disclosed. The shaft comprises an inner portion on whose periphery a plurality of targets (240, 260, 280) separated by spacers (250, 270) are mounted. This is achieved exerting an axial pressing force (F, F') to the peripheral parts, rather than applying a radial press fit. In this manner, a simplified construction, a higher stiffness and a higher stability at high rotational speed are achieved. Further disclosed is a rotor having a thrust disk (220) whose diameter decreases towards the periphery. This allows to use a larger thrust disk at a given rotational speed.

25 Claims, 4 Drawing Sheets

ROTOR SHAFT FOR A MAGNETIC BEARING DEVICE

FIELD OF THE INVENTION

The present invention relates to a rotor shaft for a magnetic bearing device with the features of the preamble of claim 1, to a magnetic bearing device comprising such a rotor shaft, and to a method of manufacture of a rotor shaft.

BACKGROUND OF THE INVENTION

In the art, magnetic bearing devices are well known in which a rotor is supported for rotation around a rotation axis by a set of active magnetic bearings. The rotor generally comprises a central shaft which is surrounded by a plurality of active magnetic bearing units, each such unit generally comprising a plurality of electromagnets. Often, the magnetic bearing device further comprises a motor for driving the rotation of the rotor, the motor usually also comprising a plurality of electromagnets.

The shaft generally comprises a plurality of annular targets for the electromagnets which are disposed on the periphery of the shaft. The targets are normally ferromagnetic and serve for closing the magnetic flux paths of the electromagnets. They usually consist of a package of stacked and laminated ferromagnetic metal sheets electrically insulated from each other. Such metal sheet packages minimize the effects of eddy currents, which would lead to strong dissipative losses and to undesired heating of the shaft. The targets are often separated axially by nonmagnetic spacers.

The shaft together with the targets is usually manufactured in a particular manner involving a number of distinctive steps. Normally, first the individual sheets are die-cut (punched) into an annular shape. Then the sheets are stacked into a jacket to form a stacked sheet package. The jacket holds and centers the sheets for grinding the inner diameter to tight tolerances and mounting. Several such sheet packages, separated by annular spacers, are then heated and are slid onto the "naked" rotor shaft (i.e., the inner shaft portion) while hot. Upon cooling, the sheet packages and the annular spacers shrink to yield a radial shrink fit with the central portion of the shaft. Finally, the jacket is removed from the laminated sheet packages.

This procedure can lead to a rather large unbalance of the resulting rotor shaft, mainly because the targets usually slightly change their shape and radial position during shrink-fitting. It is therefore generally necessary to trim the final product by finishing it on a lathe (grinding or turning machine). This additional step is time-consuming and increases the cost of the final product.

The fact that the targets are mounted by a shrink fit leads to a number of additional disadvantages. The shrink fit produces a permanent radial stress load on the target. During rotation, this permanent, static load adds to the dynamic load caused by centrifugal forces. Thereby, the maximum allowable rotational speed is more limited than necessary. A further complication arises from the fact that generally the materials of the inner shaft portion and of the targets have different temperature coefficients. During operation, the rotor shaft generally heats, leading to expansion of these parts to different extents. The shrink fit must be designed in a manner to take this expansion over the whole range of operational temperatures and over the whole range of rotational speeds into account, such that under all operational conditions the total radial stress on the shrink fit neither approaches zero nor becomes too high. This limits the choice of materials for the different parts of the rotor shaft and places very high demands on the dimensional tolerances, especially for small rotors.

In JP-A 01-122333 it has been suggested to fit the targets on the outer periphery of a central shaft portion by axial clamping. However, this concept has not become widely accepted in practice because the stability of a rotor shaft constructed in this way cannot be easily ensured, and large unpredictable variations in the mechanical properties may occur between different rotor shafts constructed in the same manner.

A rotor shaft for a magnetic bearing device often also carries a thrust disk which serves as the target for the electromagnets in the axial bearings. A high rotational speed is often also prevented by the limitations imposed by the presence of this thrust disk. The larger the diameter of the thrust disk, the larger the load on the material of the disk at high rotational speed. Therefore there has been a tendency in the art to keep the thrust disk small, in particular, significantly smaller than the axial bearing units. This, however, entails the use of specifically shaped yokes for the axial bearing units, which guide the magnetic flux radially towards the center and to the air gap with the thrust disk. This, in turn, increases the total length of the magnetic bearing device, hampers the development of smaller axial bearings, and increases costs.

SUMMARY OF THE INVENTION

It is therefore an object of the present invention to provide a rotor shaft which may be manufactured easily and with reproducible properties, and which is suitable for achieving high rotational speeds.

This object is achieved by a rotor shaft for a magnetic bearing device according to claim 1.

It is a further object of the present invention to provide a magnetic bearing device with such an improved rotor shaft. This object is achieved by a magnetic bearing device according to claim 12.

It is still another object of the present invention to provide a simple method for manufacturing a rotor shaft which leads to a shaft with reproducible properties.

This object is achieved by a method according to claim 13.

Advantageous embodiments of the invention are laid down in the dependent claims.

Thus, a rotor shaft for a magnetic bearing device is provided, said rotor shaft comprising a inner shaft portion and at least one substantially annular target for an electromagnet. The target is disposed on a periphery of said inner shaft portion. According to the present invention, the target is held between two collars exerting an axial pressing force on the target in a manner such that said axial pressing force is strongest near an outer periphery of said rotor shaft. In this manner, a rotor shaft is obtained which has a simplified construction, a higher stiffness and a higher stability at high rotational speed. Preferably, the collars are designed in a manner that they abut to the target only near the periphery of the target. The term "near the outer periphery" is to be understood to designate a radial range which covers at most the outer 50%, preferably at most the outer 30% of the radial range of the annular target, measured at the axial position where the force is applied. In other words, the force is applied closer to the outer than to the inner circumference of the target.

Preferably, the axial pressing force is stronger than any radial force between the target and the inner shaft portion when the rotor shaft is at standstill. In other words, the target is predominantly held by axial rather than radial forces. In particular, preferably the target is not held by a press fit.

In contrast to the situation where a shrink fit is employed, a gap may be present between the target and the inner shaft portion. This gap may be filled with a suitable gap filling material after mounting of the target. Preferably, the gap filling material is selected from pottants, epoxy and solder. By disposing a gap filling material in the gap, it is ensured that the unbalance remains unchanged during operation of the magnetic bearing device.

Often, the target will comprise a plurality of stacked annular sheets extending essentially in a radial direction, e.g., the target may be formed by a ring-shaped laminated sheet package. It is especially advantageous to hold such a package by axial rather than radial forces because it is notoriously difficult to manufacture such a stacked sheet package with small enough tolerances for a shrink fit.

An axial force which is strongest near the outer periphery can be easily ensured if at least one of the collars abutting to the target is formed by a protrusion in the axial direction, said protrusion being disposed near the outer periphery of the rotor shaft. Preferably, the protrusion has an annular shape, at least in sections, and is concentric with the shaft axis. In a preferred embodiment, the protrusion is fully ring-shaped.

The rotor shaft may comprise one or more spacers separating the target from further targets on the same shaft. In this case, one of the collars for each target may be formed by the spacer.

The inner shaft portion may have several distinct sections. In particular, it may have a substantially cylindrical section surrounded by the target, a shoulder substantially extending from the cylindrical portion in a radial direction, and a ring-shaped axial protrusion on the shoulder concentric with the shaft axis, wherein one of the collars is formed by the protrusion on the shoulder.

For easily mounting the target on the shaft, the inner shaft portion advantageously has a male thread on which a nut having a female thread interacting with said male thread is mounted to exert the pressing force.

The target and/or at least one of said collars may comprise a depression and/or a protrusion for centering the target on the inner shaft portion in a radial direction. Alternatively, the target may be simply centered by the inner shaft portion at the inner circumference of the target.

The present invention further provides a rotor shaft for a magnetic bearing device, the rotor shaft carrying a thrust disk. The thrust disk preferably has a thickness which radially decreases towards the periphery in a substantially continuous manner. Preferably, the thrust disk is tapered towards the periphery on both axial sides in a substantially symmetric manner. The thickness advantageously decreases continuously by at least 25%, more preferred by at least one third. Advantageously, the decrease is gradual. In other words, the thickness preferably decreases continuously in an annular region which extends radially over a range of at least 25%, preferably at least one third of the radius of the thrust disk.

The thrust disk preferably has a first region with a first substantially uniform thickness, said first region being disposed near said inner shaft portion, and a second region with a second substantially uniform thickness smaller than said first uniform thickness, said second region being disposed near the periphery of the thrust disk. These regions of uniform thickness serve for being disposed in a facing configuration to the pole shoes of the axial bearing units. Thereby construction of the axial bearing units is simplified. A tapered region between said first and said second region is then advantageously provided, in which the thickness decreases towards the periphery from said first uniform thickness to said second uniform thickness in a substantially continuous manner.

The thrust disk with a decreasing thickness may be advantageously combined with a shaft with targets mounted by axial clamping, as described above.

The invention is further directed at a magnetic bearing device comprising a rotor shaft as described above, and which comprises at least one active magnetic bearing unit for magnetic interaction with the target and/or the thrust disk. In particular, the magnetic bearing device may comprise at least one, generally two, radial magnetic bearing units surrounding corresponding targets on the shaft in different axial positions along the shaft, and/or at least one axial bearing unit disposed in an axially confronting configuration with the thrust disk.

The rotor shaft according to the present invention is easily manufactured by providing an inner shaft portion having a substantially cylindrical portion, a collar disposed on one axial side of said cylindrical portion, and a male thread disposed on another axial side of said cylindrical portion;

providing a plurality of stacked annular sheets for forming a target;

providing a nut having a female thread;

sliding said plurality of stacked annular sheets onto said substantially cylindrical portion of said inner shaft portion to form said target; and fastening said nut with said female thread onto said male thread for exerting an axial pressing force onto said target in a manner that said axial pressing force is largest near an outer periphery of said rotor shaft.

The collar may be formed in one piece with the inner shaft portion, or it may be provided on a part mounted to the inner shaft portion, such as a second nut or an additional spacer. The target may be prefabricated or may be formed on the inner shaft portion by stacking individual sheets.

BRIEF DESCRIPTION OF THE DRAWINGS

The invention will be described in more detail in connection with exemplary embodiments illustrated in the drawings, in which.

DETAILED DESCRIPTION OF PREFERRED EMBODIMENTS

Figure 1:
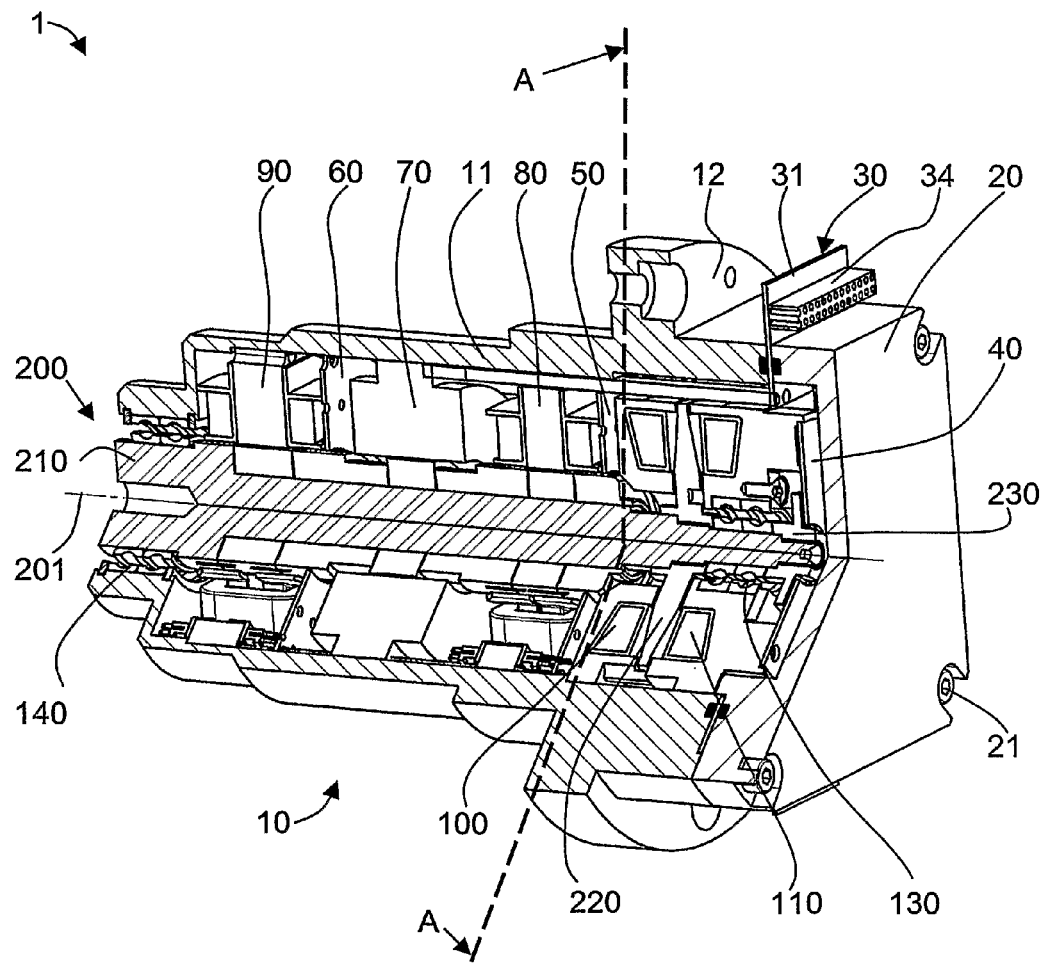
FIG. 1 shows a schematic perspective view of a magnetic bearing device, partially in a sectional view.
Figure 2:
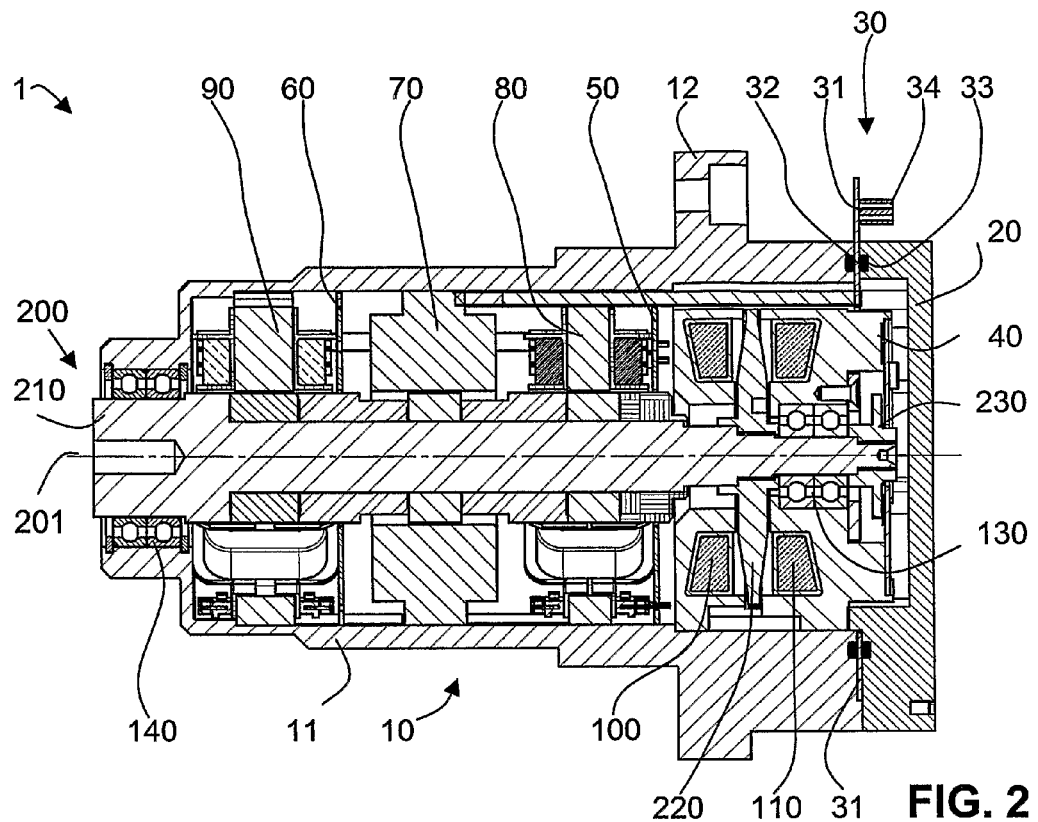
FIG. 2 shows a cross section of the magnetic bearing device of FIG. 1 in the plane A-A.
Figure 3:
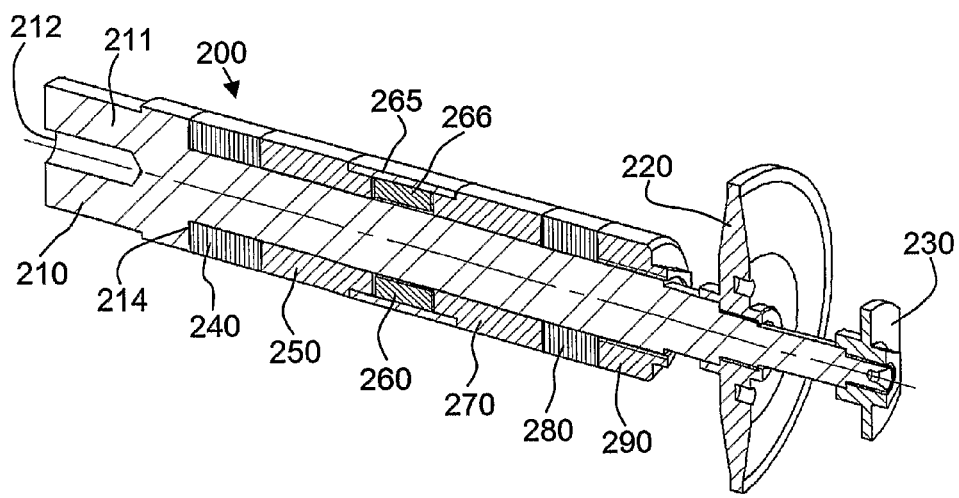
FIG. 3 shows a schematic perspective side sectional view of a rotor.
Figure 4:
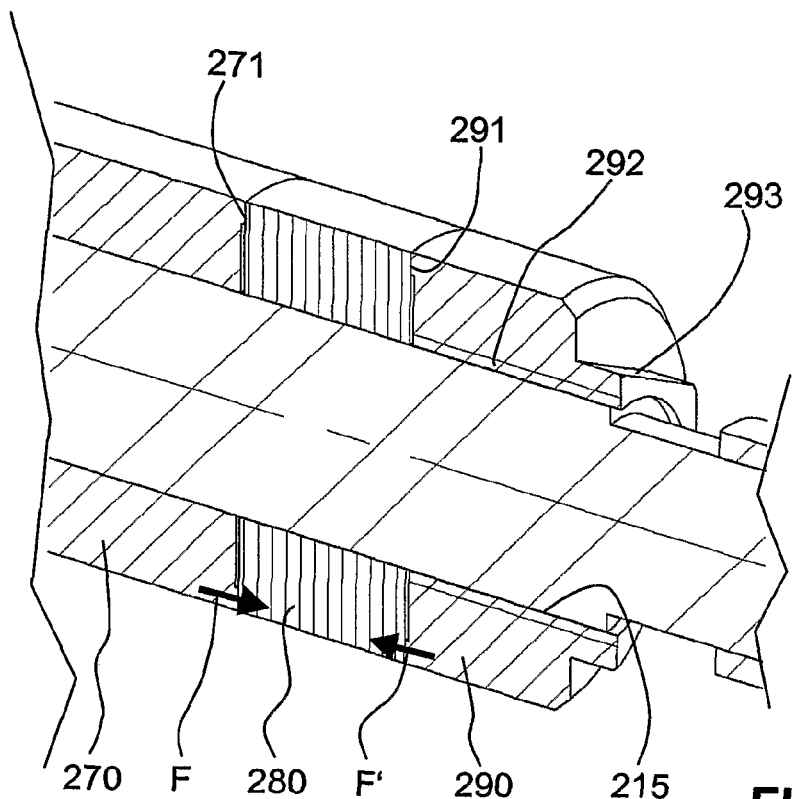
FIG. 4 shows a first enlarged partial perspective side sectional view of the rotor of FIG. 3.

FIGS. 1 and 2 show a magnetic bearing device as it is suitable, e.g., for supporting a rotor body carrying the blades of a turbomolecular pump (TMP). A rotor shaft 200 is suspended magnetically in this device for rotation around a rotation axis 201. To this end, a number of magnetic bearing units are provided. A pair of axial or thrust bearing units 100, 110 interact with a thrust disk 220 mounted on an axle-like central shaft portion 210 and stabilize the position of the rotor shaft 200 against translational displacements in the axial direction. A first radial bearing unit 80 and a second radial bearing unit 90 stabilize the positions of those shaft portions which are close to these bearing units against radial displacements, thereby achieving stabilization against translational displacements of the shaft in the radial directions and of tilt displacements around the radial directions. A motor unit 70 drives the rotation of the rotor shaft. Auxiliary touchdown bearings implemented as dual ball bearings 130, 140 keep the shaft in place in case that the magnetic bearings are switched off or fail. Alternatively other types of bearings can be used, e.g. single ball bearings or sliding bearings.

A number of sensor units are provided for detecting displacements of the shaft. An axial displacement sensor is formed on a first sensor board 40, while radial displacement sensors are formed on second and third sensor boards 50, 60. These sensors detect displacements of the shaft along predetermined directions.

The rotor shaft 200 is shown in more detail in FIGS. 3 to 6. It comprises an inner shaft portion 210, which serves as a carrier for first, second and third targets 240, 260 and 280, first and second spacers 250 and 270, a bracing nut 290, a thrust disk 220, and a distal nut 230.

The axle-like inner shaft portion 210 has, at its proximal end, a large-diameter section forming a cylindrical supporting surface 211 and having a central bore 212. The supporting surface serves for receiving the auxiliary bearing 140, as apparent from FIGS. 1 and 2, whereas the bore serves for mounting a rotor body, e.g., the body carrying the rotor blades of a TMP, to the shaft.

The large-diameter proximal section ends at a shoulder 214. The proximal large-diameter section is adjoined by a long cylindrical section of reduced diameter. The targets 240, 260 and 280 and the spacers 250 and 270 are disposed on the periphery of this cylindrical section. The cylindrical section is adjoined by a first male thread 215 whose outer diameter does not exceed the diameter of the cylindrical section and on which the bracing nut 290 is mounted.

Further towards the distal end, the inner shaft portion has a radial shoulder 216 and a second male thread 217 for mounting the thrust disk 220. Yet another radial shoulder 218 and a third male thread 219 serve for mounting the distal nut 230.

The inner shaft portion is preferably made in one piece, and it preferably consists of a nonmagnetic metal such as austenitic steel or aluminium.

Slid onto the cylindrical section of the inner shaft portion 210 is the first target 240. In operation, this target serves for closing the magnetic flux paths of the first radial magnetic bearing unit 90. The target consists of a plurality of stacked, laminated, ferromagnetic annular metal sheets, the plane of the sheets extending in the radial direction.

The first target 240 is adjoined in the radial direction by the first spacer 250 manufactured from a nonmagnetic metal such as austenitic steel or aluminium, which has likewise been slid onto the cylindrical section of the inner shaft portion 210. Abutting to the first spacer 250, the second target 260 is provided, which is followed by a second spacer 270 of a similar design as the first spacer 250. The second target 260 serves for closing the magnetic flux paths of the motor unit 70. It comprises a plurality of permanent magnets 266 which are held at their periphery by a thin-walled annular, circumferential sleeve or jacket 265 made, e.g., from steel or from a carbon fiber compound. The magnets are bonded to the sleeve in a known manner.

Abutting to the second spacer 270, the third target 280 is provided. This target serves for closing the flux paths of the second radial bearing unit 80. As the forces which must be taken up by this unit are generally somewhat smaller than those in the first radial bearing unit 90, the second radial bearing unit 80 and the corresponding second target 280 are somewhat smaller than the first unit 90 and the first target 240. Apart from this size difference, the third target 280 is of the same design as the first target 240.

The bracing nut 290 is provided in a position adjoining the third target 280. It has a female thread 292 provided in its central through-hole, with which the nut 290 is screwed onto the inner shaft portion 210 with aid of a hexagonal tightening section 293. The bracing nut serves for exerting an axial pressing force (in other word, a clamping or bracing force) F' to the targets 240, 260 and 280 and the spacers 250 and 270. It is this pressing force together with the reactive force F which holds the targets and spacers in their positions. In other words, at least during standstill of the magnetic bearing device, the axial pressing force F, F' is substantially stronger than any radial forces between the inner shaft portion and the targets and spacers. In particular, the targets and spacers are provided on the inner shaft portion in a manner that allows these parts to freely slide on the inner shaft portion, and no shrink fit is applied.

The axial pressing force F, F' is applied predominantly along the outer periphery of the shaft. To this end, ring-shaped (annular) axial protrusions are provided on the shoulder 214 of the large-diameter proximal section of the inner shaft portion 210, on one axial face of each spacer 250 and 270, on the periphery of the second target 260, and on the axial face of the bracing nut 290 which faces the third target 280. These protrusions are concentric with the shaft axis and extend all around the circumference of the shaft in a radial region near the outer periphery of the shaft. This can be seen best in FIG. 4, in which a protrusion 271 on the face of spacer 270 can clearly be seen, said protrusion facing the third target 280, and in which the corresponding protrusion 291 on the bracing nut 290 is clearly visible. These protrusions act as collars for clamping the third target 280 in the axial direction. Likewise, corresponding protrusions on the other parts act as collars for clamping the first and second targets 240 and 260. The protrusions ensure that the axial pressing forces F, F' are applied only or pre-dominantly at the outer periphery.

Instead of providing annular axial protrusions (or, in other words, ring-shaped shoulders) on the parts adjoining the targets, such protrusions may also have other shapes and need not extend in an uninterrupted manner around the circumference of the shaft. By the way of example, a similar stabilizing effect may be achieved by providing a plurality of small axial protrusions distributed evenly along the circumference of the respective parts. Instead of having distinct protrusions, the respective parts may be tapered smoothly towards the center. What is important is that the axial force is applied predominantly near the periphery of the shaft.

Figure 5:
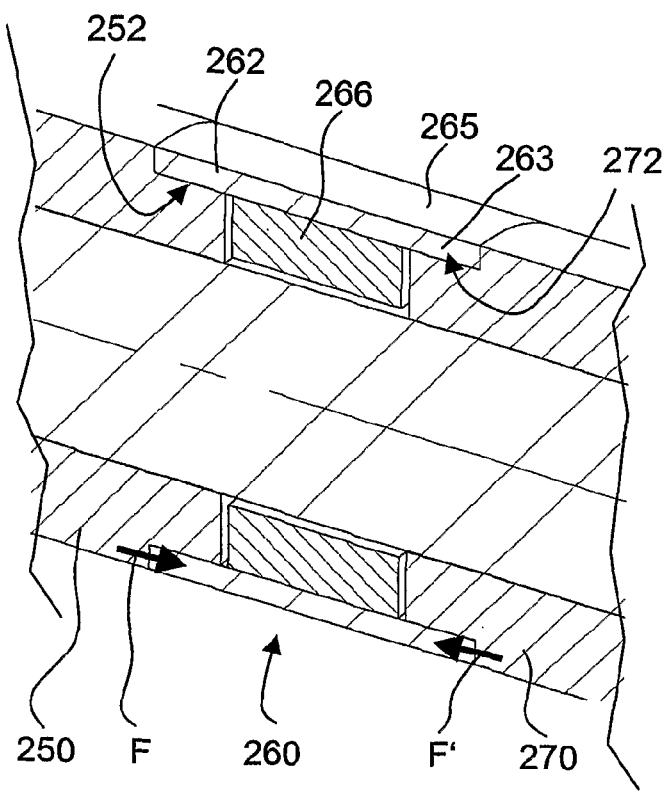
FIG. 5 shows a second enlarged partial perspective side sectional view of the rotor of FIG. 3.

The first and third targets 240 and 280 as well as the spacers are centered with respect to the inner shaft portion at their respective inner diameter. In contrast, the second target 260 for the motor unit is centered by protrusions and depressions provided on the target and the spacers 250, 270, respectively, as is best seen in FIG. 5. The spacer 250 has a ring-shaped depression 252 close to its periphery. The target 260 has a corresponding ring-shaped protrusion 262 extending axially into the depression 252 and further protruding axially than the depth of depression 252. The spacer 270 likewise has a depression 272, and the target 260 has a corresponding second protrusion 263. In this way, the target 260 may be centered relative to the spacer 250, while at the same time it is ensured that any axial forces between the spacer 250 and the target 260 are applied near the periphery of the target. The target is efficiently centered even if there are large manufacturing tolerances for the inner diameter of the target 260.

Mounting the targets by axial clamping has a number of advantages, some of which are listed in the following.

Since the peripheral parts (targets, spacers) are not preloaded by radial stress from a shrink fit, higher rotational speeds (rotational frequencies) can be achieved than by a shaft of the same size constructed in the conventional manner.

As the force for holding the peripheral parts in place acts in the axial direction, the effective holding (clamping) force is virtually independent of rotational speed.

The targets may have larger tolerances than would be required for a shrink fit.

The inner shaft portion acts as an elastic tie rod, i.e., as an axial spring for the axial pressing force. Forces which might vary due to different temperature coefficients act predominantly in the axial rather than in the radial direction. These forces can be partially neutralized by an elastic expansion the inner shaft portion. In contrast, in the prior art such thermal forces act mainly in the radial direction and will be carried predominantly by the peripheral parts which are already preloaded and subjected to a considerable dynamic load at high rotational speed.

By the axial pressing force being applied near the outer periphery of the shaft, the stiffness of the whole shaft construction is considerably increased both over a conventional shaft employing a shrink fit and over a shaft in which an axial force is applied in a less well-defined manner. The increased stiffness leads to a higher bending eigenfrequency and thus to easier control.

The auxiliary bearings may be provided in almost arbitrary positions along the rotor shaft, since they may be easily mounted and dismounted, even if their diameter is smaller than the other target elements.

In case of a failure of individual rotor parts, the rotor may be easily repaired, e.g., by replacing an individual target or spacer or an auxiliary bearing mounted on the shaft.

The process of mounting the shaft is simplified because there is no need for an additional finishing/lathing step after assembly.

The simplified construction of the shaft may in some cases entail some unbalance which may be due to imperfect centering of the targets, especially if no additional finishing step is performed. This unbalance is often negligible in comparison to the unbalance caused by the rotor body attached to the shaft, e.g., the unbalance of the pump blades in the example of a TMP. Large unbalance requires larger air gaps in the bearings which need larger bearing currents. Therefore such unbalance may be an important issue especially for small bearing devices, where the achievable bearing currents may be limited by the available space for the bearing coils.

In the example of FIGS. 1 and 2, an improved construction of the radial bearings 70, 90 allows for larger unbalance. These bearings are constructed as heteropolar bearings having only four pole shoes for four windings, i.e., each pole shoe carries the magnetic flux of two windings, one for the radial x direction and one for the radial y direction. This allows for a much increased cross section of each winding as compared to a conventional eight-pole bearing with four windings. Due to the increased flux, it is possible to increase the air gap for achieving the same bearing forces, thus accommodating a rotor even with increased unbalance.

The windings may be advantageously connected to their driving amplifiers in a manner as described in European patent application No. 04 405 354.4 filed Jun. 8, 2004, especially in the manner as shown in FIG. 7 therein. In other words, the four windings may be connected to a common star point. The two windings for the +x and −x directions would receive currents whose sum is constant and positive, both currents flowing in the same direction towards the star point. The other two windings for the +y and −y directions would then, by the star point condition, carry away the same sum of currents. This may be achieved by connecting the +x and +y windings in series between the ports of an H bridge amplifier, connecting the −x and −y windings likewise in series between the ports of a second H bridge amplifier, and by connecting the common point between the +x and +y windings with the common point between the −x and −y windings to form the star point (Common node). Control would be achieved by varying the distribution of currents between the +x and −x windings and between the +y and −y windings while keeping the sum of currents (which is equal to twice the bias current of each winding) constant. In the configuration of FIGS. 1 and 2, such a connection scheme is particularly suited because in practice the sum of the flux through each pair of opposite pole shoes will generally be identical, and because the number of connections between coils and controller is half of the conventional H bridge amplifier.

Figure 6:
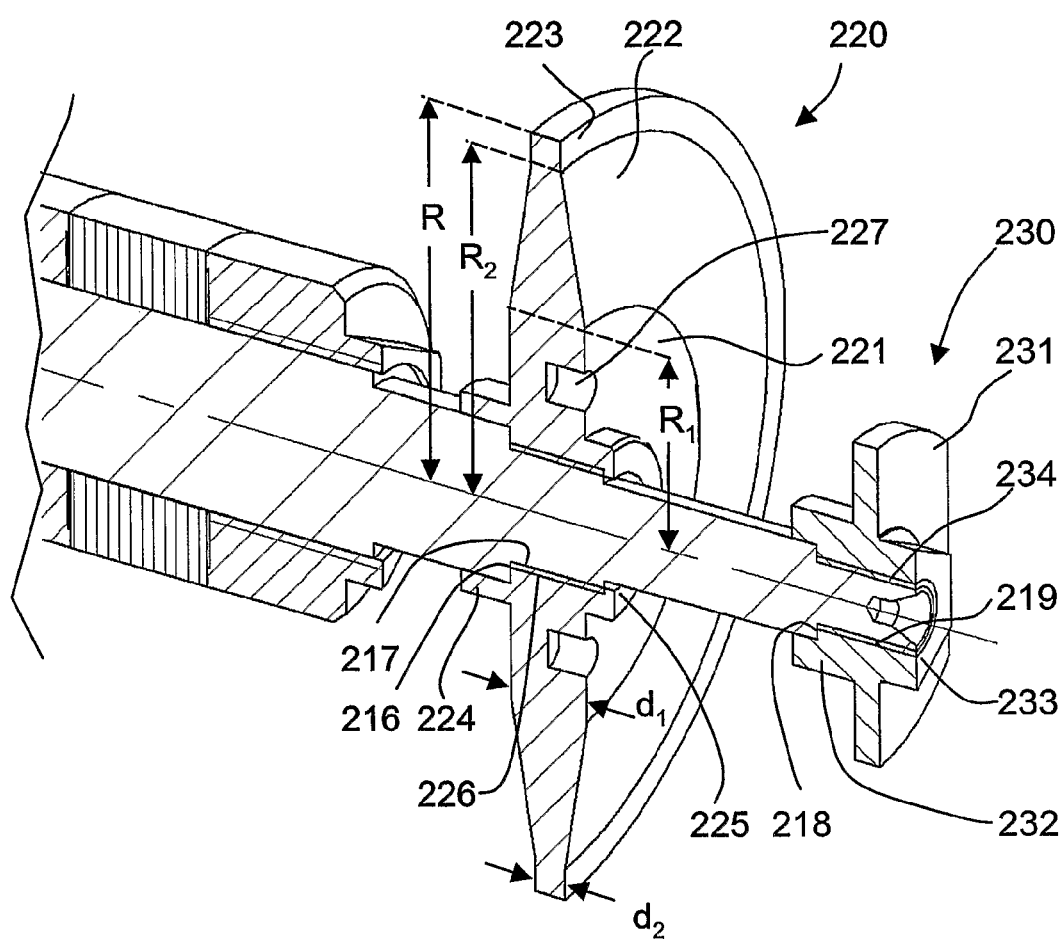
FIG. 6 shows a third enlarged partial perspective side sectional view of the rotor of FIG. 3.

FIG. 6 shows a partial view of the shaft which highlights the thrust disk 220. The thrust disk is mounted to the inner shaft portion 210 by a female thread 226 interacting with a male thread 217 of the inner shaft portion 210. It abuts axially to a radial shoulder 216 which serves as a stop when the disk is screwed onto the inner shaft portion. A ring-shaped axial protrusion 224 on one axial face of the disk tightly surrounds the inner shaft portion in order to better stabilize the disk. A second ring-shaped axial protrusion 225 serves as a stop for the auxiliary bearing 130 visible in FIGS. 1 and 2 in order to enable this bearing to take up axial forces. Holes 227 are provided in the face of the disk for fastening the disk to the inner shaft portion.

Apart from the protrusions, the disk has a uniform thickness $d_1$ in an inner range up to a first radius $R_1$. The thickness then diminishes constantly to a value $d_2$ in a tapered region over a range extending between radius $R_1$ and radius $R_2$. In a third annular region near the periphery, the thickness is again uniform. As is apparent from FIGS. 1 and 2, annular pole shoes are provided in the axial bearing units which face the regions of uniform thickness. Because the pole shoes face regions of uniform thickness, the construction of these pole shoes is simplified.

This construction enables to provide a larger thrust disk for a predetermined maximum rotational frequency, without increasing the mass of the thrust disk. The thrust disk of this construction has excellent stability. The axial bearing units may be constructed in a simpler manner because no yokes are required for additionally guiding the magnetic flux inwards. In the present example, a thrust disk with radially decreasing thickness is also advantageous because relatively large radial-diameter bearing units are employed. It is then sensible to employ also axial bearings having a relatively large diameter, which entails the use of a relatively large-diameter thrust disk.

The magnetic forces achievable with such a thrust disk are actually not smaller than for a disk having the same diameter and a uniform thickness $d_1$: The total magnetic cross-sectional area at the outer pole of the axial bearing is approximately the same as at the inner pole because of the larger circumference of the air gap at the outer pole. The magnetic cross section is defined as the area perpendicular to the magnetic flux through which the magnetic flux lines extend. In the present example, the magnetic cross section will be approximately perpendicular to the radial direction in the tapered region of the thrust disk which extends between the pole shoes of the axial bearing units. The magnetic cross-sectional area will therefore be approximately given by the product of circumference and thickness in this region. In particular, this leads to the following rule of thumb for advantageously choosing the thickness as a function of radius: The cross-sectional area, i.e., the product of thickness and circumference, and therefore the product of thickness and radius, should be approximately constant over the whole tapered region in which the thickness decreases. While this criterion would lead to a hyperbolic dependence of thickness on radius, for reasons of ease of manufacture generally a linear decrease is preferably chosen which approximates the hyperbolic decrease. For the same reason, the outer region of uniform thickness (between $R_2$ and the disk radius R) extends over a smaller radial range than the inner region of uniform thickness up to radius $R_1$.

In the present example, the thickness decreases in a symmetric manner, i.e., the two sides of the disk have the same angle of inclination. Depending on the construction of the axial bearing units, this is however not necessary, and in particular it is conceivable that only one face of the disk is tapered.

The radial range over which the thickness decreases is relatively large, and the angle of inclination of the tapered portion of the disk is relatively small. This is advantageous because it enables a smooth distribution of the flux and because this satisfies the above considerations relating to the magnetic cross section. Preferably, the radial range over which the thickness decreases extends over at least about a quarter of the total radius. In the present example, this range exceeds over about a third of the total radius. The exact value will largely depend on the construction of the axial bearing units, in particular, on the radial distance between its pole shoes. Likewise, the thickness at the periphery of the disk is preferably reduced by at least about quarter, more preferred at least about one third of the thickness in an inner region of the disk.

At the distal end of the shaft, the distal nut 230 is mounted in a manner similar to the thrust disk 220, i.e., by virtue of a male thread 219 on the inner shaft portion, a female thread 234 in the nut, a shoulder 218 acting as a stop to which the nut axially abuts, a ring-shaped protrusion extending axially beyond the stop and partially enclosing the inner shaft portion 210, and with the aid of a hexagonal section 233. This distal nut serves as a target for an axial displacement sensor, which is preferably of the eddy-current type, and for a rotation sensor such as a pulse sensor or resolver. To this end, the nut will generally not be rotationally symmetric, as apparent from FIG. 6.

The bearing units as well as the sensor boards are enclosed by a housing 10. The signals from the sensors are fed to a control unit (not shown in FIG. 1) which is disposed outside of the housing 10. In the control unit, appropriate control voltages or currents for the bearing units are derived from these signals and are fed from the control unit to the bearing units.

For feeding the signals and currents between the control unit and the magnetic bearing device, an electrical feedthrough 30 through the wall of the housing 10 is provided. The feedthrough 30 comprises a printed circuit board (PCB) 31 extending essentially perpendicular to the long axis of the housing 10 (i.e., perpendicular to the rotation axis). The board extends across the wall of the housing 10 and sections the wall all the way along an inner circumference of the housing, i.e., it divides the housing into two parts. The cross-section along which the board extends is perpendicular to the rotation axis. Details of the feedthrough are disclosed in European patent application No. 05 405 492.9 filed Aug. 24, 2005, the disclosure of which is incorporated herein by reference in its entirety for teaching an improved electrical vacuum feedthrough.

The radial displacement sensors are preferably of the type disclosed in WO-A 2004/048883. Such a multiple-axis radial displacement sensor comprises a primary inductive element placed around the shaft, and a plurality of secondary inductive elements disposed in the vicinity of this primary inductive element. By providing a time-varying current to the primary inductive element and detecting the induced voltages in the secondary elements, displacements of the shaft can be determined. All inductive elements may readily be implemented as printed coils on a single, common printed circuit board. Thereby, a highly efficient and very simple radial displacement sensor is achieved. In particular, each of the second and third sensor boards 50, 60 preferably implements such a multiple-axis radial displacement sensor in its conductive (trace) layers.

The axial displacement sensor may likewise be implemented in the conductive layers of the first sensor board. Such a sensor may be of a conventional single- or multi-coil eddy-current sensor type, which determines a distance between the first sensor board and the radial flange 231 on the distal nut 230 at the end of the shaft 200. Alternatively, the axial displacement sensor may be of the kind disclosed in EP application No. 05 405 009.1 filed Jan. 11, 2005. Such an axial displacement sensor comprises two concentric and essentially coplanar coils which are fed with AC currents of the same frequency, but with opposite phases (opposite directions around the rotation axis). Thereby, the sensitive area of the sensor is essentially limited to the area between the coils, and disturbances are greatly reduced.

Also the rotation sensor may be implemented in the conductive layers of the first sensor board, e.g., in the manner described in EP application No. 05 405 009.1 referenced above. Such a multiple-axis radial displacement sensor is very similar in its setup to the multi-axis radial displacement sensor described above, i.e., it comprises a primary inductive element placed around the shaft, and a plurality of further inductive elements disposed in the vicinity of this primary inductive element. In particular, the primary inductive element is placed around a portion of the nut 230 at the end of the shaft 200, which portion is not rotation-symmetric, but has at least one notch or recess. By providing a time-varying current, in particular, a high-frequency AC current, to the primary inductive element and detecting the induced voltages in the secondary elements, the rotary state of the rotor may be determined. The inductive elements may again be readily implemented as printed coils in the conductive layers of the first sensor board. In particular, the primary inductive element may be identical with one of the coils of the axial displacement sensor, further simplifying the setup.

In an alternative embodiment, one of the radial displacement sensors may be disposed on the same side of the axial bearings 100, 110 as the axial displacement sensors, and these sensors may even be combined in a single multiple-sensing unit, as described, e.g., in WO 2005/026557.

All printed circuit boards (sensor boards 40, 50, 60 and the PCB of feedthrough 30) have concentric openings for accommodating the rotor shaft. In particular, the board 31 of feedthrough 30 has an opening whose diameter is larger than the diameter of thrust disk 220. In this way, the magnetic bearing device may be assembled easily, and the rotor remains easily accessible in case that servicing should prove necessary.

The magnetic bearing device according to the present invention is particularly useful if it is comprised in a vacuum pump, in particular a turbo-molecular vacuum pump, in which the rotor shaft carries a plurality of pump blades. A different application may be a turbopump for a gas compressor as it is used, e.g., in air conditioners. It is to be understood, however, that the invention is not limited to such applications.

LIST OF REFERENCE SIGNS 1 magnetic bearing device
2 control unit
10 housing
11 main body
12 flange
13 circular groove
14 cap
20 cap
21 screw
23 circular groove
30 electrical feedthrough
31 printed circuit board
32 connector
40 first sensor board
50 second sensor board
60 third sensor board
70 motor unit
80 first radial bearing unit
90 second radial bearing unit
100 first axial bearing unit
110 second axial bearing unit
130 first auxiliary bearing
140 second auxiliary bearing
200 rotor shaft
201 rotor axis
210 inner shaft portion
211 first support surface
212 bore
214 first collar
215 first male thread
216 second collar
217 second male thread
218 third collar
219 third male thread
220 thrust disk
221 inner (straight) portion
222 intermediate (tapered) portion
223 outer (straight) portion
224 centering portion
225 nut portion
226 female thread
227 hole
230 nut
231 radial flange
232 centering portion
233 nut portion
234 female thread
240 first target
250 first spacer
252 depression
260 second target
262 protrusion
263 protrusion
265 jacket
266 permanent magnet
270 second spacer
271 protrusion
272 depression
280 third target
290 bracing nut
291 protrusion
292 female thread
293 nut portion

The invention claimed is:

1. A rotor shaft for a magnetic bearing device, the rotor shaft being configured for rotation about a rotation axis, the rotation axis defining an axial direction, the rotor shaft comprising:
an inner shaft portion and
at least one substantially annular target for an electromagnet, said target being disposed on a periphery of said inner shaft portion and having an inner circumference and an outer circumference, said target being held between two collars exerting an axial pressing force on said target in a manner such that said axial pressing force is strongest in a range closer to the outer circumference of the target than to the inner circumference of the target.

2. The rotor shaft according to claim 1, wherein said axial pressing force is stronger than any radial force between said target and said inner shaft portion when the rotor shaft is at standstill.

3. The rotor shaft according to claim 1, wherein said target comprises a plurality of stacked annular sheets extending essentially in a radial direction.

4. The rotor shaft according to claim 1, wherein a gap is present between said target and said inner shaft portion, and wherein a gap filling material is disposed in the gap.

5. The rotor shaft according to claim 1,
wherein the rotor shaft comprises a shoulder extending in a radial direction perpendicular to the axial direction,
wherein at least one axial protrusion is disposed on said shoulder, the at least one protrusion protruding from the shoulder towards said target along the axial direction,
the at least one protrusion being disposed on the shoulder closer to the outer circumference of the target than to the inner circumference of the target,
and wherein one of the collars is formed by said at least one axial protrusion.

6. The rotor shaft according to claim 1, wherein said rotor shaft comprises a spacer separating said target from a further target, and wherein one of said collars is formed by said spacer.

7. The rotor shaft according to claim 1, wherein said inner shaft portion has a substantially cylindrical portion surrounded by said target, a shoulder substantially extending from said cylindrical portion in a radial direction, and an annular protrusion disposed on said shoulder and protruding in the axial direction, and wherein one of said collars is formed by said annular protrusion.

8. The rotor shaft according to claim 1, wherein said inner shaft portion has a male thread, and wherein a nut having a female thread interacting with said male thread is mounted on said inner shaft portion to exert said pressing force.

9. The rotor shaft according to claim 1, wherein at least one of said target and said collars comprises at least one of a depression and a protrusion in a range that is closer to the outer circumference of the target than to the inner circumference of the target for centering said target in a radial direction.

10. The rotor shaft according to claim 1, said rotor shaft comprising a thrust disk having an outer periphery and a thickness which radially decreases towards the periphery in a substantially continuous manner.

11. The rotor shaft according to claim 10, wherein said thrust disk has a first region with a first substantially uniform thickness, said first region being disposed near said inner shaft portion, and a second region with a second substantially uniform thickness smaller than said first uniform thickness, said second region being disposed near the periphery of the thrust disk, and a tapered region between said first and said second region in which the thickness decreases towards the periphery from said first uniform thickness to said second uniform thickness in a substantially continuous manner.

12. A magnetic bearing device comprising a rotor shaft according to claim 1 and comprising at least one active magnetic bearing unit.

13. The rotor shaft of claim 5, wherein said at least one axial protrusion has an annular shape.

14. The rotor shaft of claim 5, wherein a plurality of said axial protrusions are distributed evenly along the circumference of the rotor.

15. A rotor shaft for a magnetic bearing device, the rotor shaft being configured for rotation about a rotation axis, the rotation axis defining an axial direction, the rotor shaft comprising:
an inner shaft portion; and
at least one substantially annular target for an electromagnet, said target being disposed on a periphery of said inner shaft portion and having an outer circumference and an inner circumference, said target being held between two collars axially abutting to the target only in a range closer to the outer circumference of the target than to the inner circumference of the target.

16. The rotor shaft according to claim 15, wherein said collars exert an axial pressing force on said target, the axial pressing force being stronger than any radial force between said target and said inner shaft portion when the rotor shaft is at standstill.

17. The rotor shaft according to claim 15,
wherein the rotor shaft comprises a shoulder extending in a radial direction perpendicular to the axial direction,
wherein at least one axial protrusion is disposed on said shoulder, the at least one protrusion protruding from the shoulder towards said target along the axial direction, the at least one protrusion being disposed on the shoulder closer to the outer circumference of the target than to the inner circumference of the target,
and wherein one of the collars is formed by said at least one axial protrusion.

18. The rotor shaft of claim 17, wherein said at least one axial protrusion has an annular shape.

19. The rotor shaft of claim 17, wherein a plurality of said axial protrusions are distributed evenly along the circumference of the rotor.

20. A rotor shaft for a magnetic bearing device, the rotor shaft being configured for rotation about a rotation axis, the rotation axis defining an axial direction, the rotor shaft comprising:
an inner shaft portion and
at least one substantially annular target for an electromagnet, said target being disposed on a periphery of said inner shaft portion, having an outer circumference and an inner circumference and extending in a radial range between the inner circumference and the outer circumference, said target being held between two collars axially abutting to the target only in a range of abutment covering at most an outer 50% of the radial range of the target.

21. The rotor shaft according to claim 20, wherein the range of abutment covers at most an outer 30% of the radial range of the target.

22. The rotor shaft according to claim 20, wherein said collars exert an axial pressing force on said target, the axial pressing force being stronger than any radial force between said target and said inner shaft portion when the rotor shaft is at standstill.

23. The rotor shaft according to claim 20,
wherein the rotor shaft comprises a shoulder extending in a radial direction perpendicular to the axial direction,
wherein at least one axial protrusion is disposed on said shoulder, the at least one protrusion protruding from the shoulder towards said target along the axial direction, the at least one protrusion being disposed on the shoulder closer to the outer circumference of the target than to the inner circumference of the target,
and wherein one of the collars is formed by said at least one axial protrusion.

24. The rotor shaft of claim 23, wherein said at least one axial protrusion has an annular shape.

25. The rotor shaft of claim 23, wherein a plurality of said axial protrusions are distributed evenly along the circumference of the rotor.

* * * * *